(12) United States Patent
Lai et al.

(10) Patent No.: US 10,807,852 B1
(45) Date of Patent: Oct. 20, 2020

(54) ELECTRICALLY-DRIVEN ROTOR IRON CORE MAGNETIC STEEL CHAMBER DISPENSING DEVICE

(71) Applicant: GALLANT MICRO. MACHINING CO., LTD., New Taipei (TW)

(72) Inventors: Hung-Neng Lai, New Taipei (TW); Mu-Ching Chang, New Taipei (TW); Chih-Hung Hsu, New Taipei (TW)

(73) Assignee: GALLANT MICRO. MACHINING CO., LTD., New Taipei (TW)

( * ) Notice: Subject to any disclaimer, the term of this patent is extended or adjusted under 35 U.S.C. 154(b) by 0 days.

(21) Appl. No.: 16/527,116

(22) Filed: Jul. 31, 2019

(30) Foreign Application Priority Data

Apr. 8, 2019 (CN) .......................... 2019 1 0274438

(51) Int. Cl.
*B67D 1/00* (2006.01)
*B67D 1/08* (2006.01)
*H02K 1/27* (2006.01)

(52) U.S. Cl.
CPC ............. *B67D 1/0042* (2013.01); *B67D 1/08* (2013.01); *H02K 1/27* (2013.01)

(58) Field of Classification Search
CPC ........... B67D 1/0042; B67D 1/08; H02K 1/27
USPC ........................................................ 222/129
See application file for complete search history.

(56) References Cited

U.S. PATENT DOCUMENTS

| | | | | |
|---|---|---|---|---|
| 9,564,790 | B2* | 2/2017 | Nagai | H02K 15/03 |
| 9,947,464 | B2* | 4/2018 | Nagai | H02K 15/03 |
| 9,960,646 | B2* | 5/2018 | Sasajima | H02K 1/04 |
| 2008/0276446 | A1* | 11/2008 | Amano | H02K 1/276 29/598 |
| 2009/0174273 | A1* | 7/2009 | Watanabe | H02K 1/276 310/156.53 |
| 2011/0000079 | A1* | 1/2011 | Fukumaru | H02K 1/2766 29/598 |
| 2012/0222289 | A1* | 9/2012 | Nagai | H02K 1/276 29/598 |
| 2013/0162063 | A1* | 6/2013 | Sasajima | H02K 1/04 310/43 |

(Continued)

*Primary Examiner* — Benjamin R Shaw
(74) *Attorney, Agent, or Firm* — Schmeiser, Olsen & Watts, LLP (57) ABSTRACT

An electrically-driven rotor iron core magnetic steel chamber dispensing device effectuates dispensing in the gap between a magnetic steel chamber and a magnetic steel chunk of an electrically-driven rotor iron core. The electrically-driven rotor iron core magnetic steel chamber dispensing device includes a plurality of dispensing units each corresponding in position to one or more magnetic steel chambers. The dispensing units correspond in position to the magnetic steel chamber and are arranged in the circumferential direction of the electrically-driven rotor. The dispensing units are arranged outside the magnetic steel chamber and positioned proximate to the magnetic steel chamber or is located in the direction of the projection of the magnetic steel chamber. A dispensing opening of each dispensing unit corresponds in position to the magnetic steel chamber from below. The dispensing device is structurally simple and reliable, attains cost-efficient use of plastic, and enables automated magnetic steel chamber dispensing.

5 Claims, 6 Drawing Sheets

(56) References Cited

U.S. PATENT DOCUMENTS

| | | | |
|---|---|---|---|
| 2013/0228280 A1* | 9/2013 | Hirayama | H02K 15/03 |
| | | | 156/293 |
| 2014/0103574 A1* | 4/2014 | Ishimatsu | B29C 45/14778 |
| | | | 264/261 |
| 2014/0327329 A1* | 11/2014 | Kitada | H02K 1/2766 |
| | | | 310/43 |

* cited by examiner

ELECTRICALLY-DRIVEN ROTOR IRON CORE MAGNETIC STEEL CHAMBER DISPENSING DEVICE

CROSS-REFERENCE TO RELATED APPLICATION

This non-provisional application claims priority under 35 U.S.C. § 119(a) on Patent Application No(s). 201910274438.1 filed in China on Apr. 8, 2019, the entire contents of which are hereby incorporated by reference.

BACKGROUND OF THE INVENTION

1. Field of the Invention

The present disclosure relates to the field of dispensing equipment, and in particular to an electrically-driven rotor iron core magnetic steel chamber dispensing device for performing a dispensing process in the gaps between a rotor iron core and a magnetic steel chunk of an electrically-driven rotor and thus fixing the magnetic steel chunk firmly to a magnetic steel chamber reserved in the rotor iron core.

2. Description of the Related Art

Magnetic steel chunks are equidistantly arranged on the inner circumferential surface of a conventional electrically-driven permanent magnetic rotor. Fixed gaps are reserved between each magnetic steel chunk and holes of a rotor iron core. An assembly process entails inserting the magnetic steel chunks into the holes of the rotor iron core. To prevent the loosening (caused by a temperature increase during high-speed rotation of the rotor) of the magnetic steel chunks and thus resultant safety risks and preclude noise otherwise generated as a result of vibration within the holes of the magnetic steel chunks. In view of this, the gaps of the magnetic steel chunks have to be filled with thermoset resin plastic so as for the magnetic steel chunks to be fixed in place. The thermoset resin is produced by heating up resin to cause a chemical change therein, followed by gradual curing. Once cured, the thermoset resin will not be softened or dissolved even if heated again.

Conventional dispensing processes generally fall into two categories. The first one is carried out manually; hence, it is inefficient and predisposed to imprecise dispensing position and uneven dispensing. The second one is carried out with a conventional dispensing device. However, the conventional dispensing device requires a lengthy dispensing channel and a large plastic block, thereby causing a waste of plastic, uneven plastic heating, and even premature curing caused by prolonged plastic flow and reaction, eventually leading to a failure to fill the gaps of the magnetic steel chunks. The prior art usually entails filling the plastic from the top to the bottom, thereby disadvantageously allowing air to linger inside the gaps of the magnetic steel chamber, leading to uneven, loose plastic filling.

Therefore, it is important to improve the prior art.

BRIEF SUMMARY OF THE INVENTION

The present disclosure provides an electrically-driven rotor iron core magnetic steel chamber dispensing device to address related issues which the prior art confronts, namely unable to perform automated dispensing, inefficient dispensing, imprecise dispensing position, uneven dispensing, lengthy channels of conventional dispensing devices, a waste of plastic, uneven plastic heating, premature curing, and failure to fill gaps of magnetic steel chunks.

To achieve at least the above objective, the present disclosure provides an electrically-driven rotor iron core magnetic steel chamber dispensing device for performing a dispensing process in gaps between a magnetic steel chamber and a magnetic steel chunk of an electrically-driven rotor iron core. The electrically-driven rotor iron core magnetic steel chamber dispensing device comprises a plurality of dispensing units each corresponding in position to one or more magnetic steel chambers, arranged in a circumferential direction of the electrically-driven rotor, disposed outside the magnetic steel chamber and positioned proximate to the magnetic steel chamber, or located in a direction of a projection of the magnetic steel chamber, wherein a dispensing opening of each said dispensing unit corresponds in position to the magnetic steel chamber from below.

The aforesaid technical measures are explained below.

1. Regarding the aforesaid technical measures, the dispensing units each comprise a dispensing channel, a dispensing head, a plunger barrel and a plunger. The dispensing channel is disposed above the dispensing head and in communication with the dispensing head. The dispensing head is disposed on the top of the plunger barrel and in communication with the plunger barrel. The plunger is disposed in the plunger barrel to slide upward and downward relative to the plunger barrel.

2. Regarding the aforesaid technical measures, the dispensing units each further comprise a channel plate. The dispensing channels are disposed on the channel plate, correspond in position to the magnetic steel chamber of the electrically-driven rotor iron core, and are arranged uniformly and circumferentially.

3. Regarding the aforesaid technical measures, the dispensing units each further comprise a dispensing plate, the dispensing opening is disposed on the dispensing plate and is an upright drain passage which tapers such that plastic in the dispensing channel on the channel plate passes through the drain passage to therefore enter the magnetic steel chamber, wherein, in an assembled state, the dispensing plate is stacked on the channel plate.

4. Regarding the aforesaid technical measures, the dispensing opening of each said dispensing unit corresponds in position to the gap between the magnetic steel chamber and the magnetic steel chunk from below.

5. Regarding the aforesaid technical measures, the magnetic steel chamber comprises an even number of said magnetic steel chambers.

The operating principles and advantages of the present disclosure are as follows: a plurality of dispensing units corresponding in position to one or more magnetic steel chambers, arranged in the circumferential direction of the electrically-driven rotor, disposed on the outside of the magnetic steel chambers and positioned proximate to the magnetic steel chambers, or located in the direction of the projection of the magnetic steel chambers, allowing a large plastic block to be replaced by smaller plastic blocks, and minimizing the length of the dispensing channel. Furthermore, the dispensing opening of each dispensing unit corresponds in position to the magnetic steel chamber from below, allowing upward filling, enhancing the compactness of the plastic filled in the gaps of the magnetic steel chamber, and enhancing the reliability of the magnetic steel chunks fixed in place. Therefore, the present invention effectively avoids a waste of plastic, uneven plastic heating, and premature curing otherwise caused by prolonged plastic flow and reaction. The present disclosure is structurally simple, innovative, and reliable, attains cost-efficient use of plastic, and enables reliable, effective, green automated magnetic steel chamber dispensing.

DETAILED DESCRIPTION OF THE INVENTION

The present disclosure is further illustrated below by embodiments and accompanying drawings.

In the first embodiment, an electrically-driven rotor iron core magnetic steel chamber dispensing device is provided.

Referring to FIGS. 1-5, FIGS. 8, 9, this embodiment provides a dispensing device for performing a dispensing process in the gaps between a magnetic steel chamber 11 and a magnetic steel chunk 12 of an electrically-driven rotor iron core 1. The rotor iron core 1 consists of four iron core segments 10 stacked up.

The dispensing device comprises a plurality of dispensing units 2. In this embodiment, the dispensing units 2 are in the number of eight. Each dispensing unit 2 corresponds in position to one or more magnetic steel chambers 11. In this embodiment, each dispensing unit 2 corresponds in position to one magnetic steel chamber. Usually, one magnetic steel chamber comprises an even number of magnetic steel chambers 11. In this embodiment, each dispensing unit 2 corresponds in position to four magnetic steel chambers 11 or an even number of magnetic steel chambers 11, but the present disclosure is not limited thereto. The dispensing units 2 correspond in position to the magnetic steel chamber 11 and are arranged in the circumferential direction of the electrically-driven rotor iron core 1.

The dispensing units 2 are located in the direction of the projection of the magnetic steel chamber 11. A dispensing opening 25 of each dispensing unit 2 corresponds in position to the magnetic steel chamber 11 from below. In this embodiment, the dispensing units 2 are located in the direction of the projection of the magnetic steel chamber 11, and the dispensing openings 25 of the dispensing units 2 correspond in position to the magnetic steel chamber 11 from below. Waste 3 mostly overlaps the magnetic steel chamber 11 in its projection direction to therefore minimize the length of a dispensing channel 26 or even render the dispensing channel 26 unnecessary.

The dispensing units 2 each comprise the dispensing channel 26, a dispensing head 22, a plunger barrel 21 and a plunger 20. The dispensing head 22 is disposed at the top of the plunger barrel 21. The dispensing channel 26 is in communication with the plunger barrel 21. The plunger 20 is disposed in the plunger barrel 21 and slidable upward and downward within the plunger barrel 21. The dispensing opening 25 is disposed at the top of the dispensing head 22 and in communication with the dispensing channel 26. In this embodiment, the dispensing device further comprises a driving device. The driving device drives the plunger 20 to move upward and downward. In this embodiment, the driving device is a servomotor. By controlling the speed of the servomotor, it is feasible to control speed levels and thereby drive the plunger 20 to move upward relative to the plunger barrel 21, so as to compress a thermoset resin plastic in the plunger barrel 21, thereby causing the plastic to pass through the dispensing channel 26 and thereby end up in the gaps between the magnetic steel chamber 11 and the magnetic steel chunk 12. After the plastic has thermally set, the magnetic steel chunk 12 is firmly fixed into the magnetic steel chamber 11.

Figure 1:
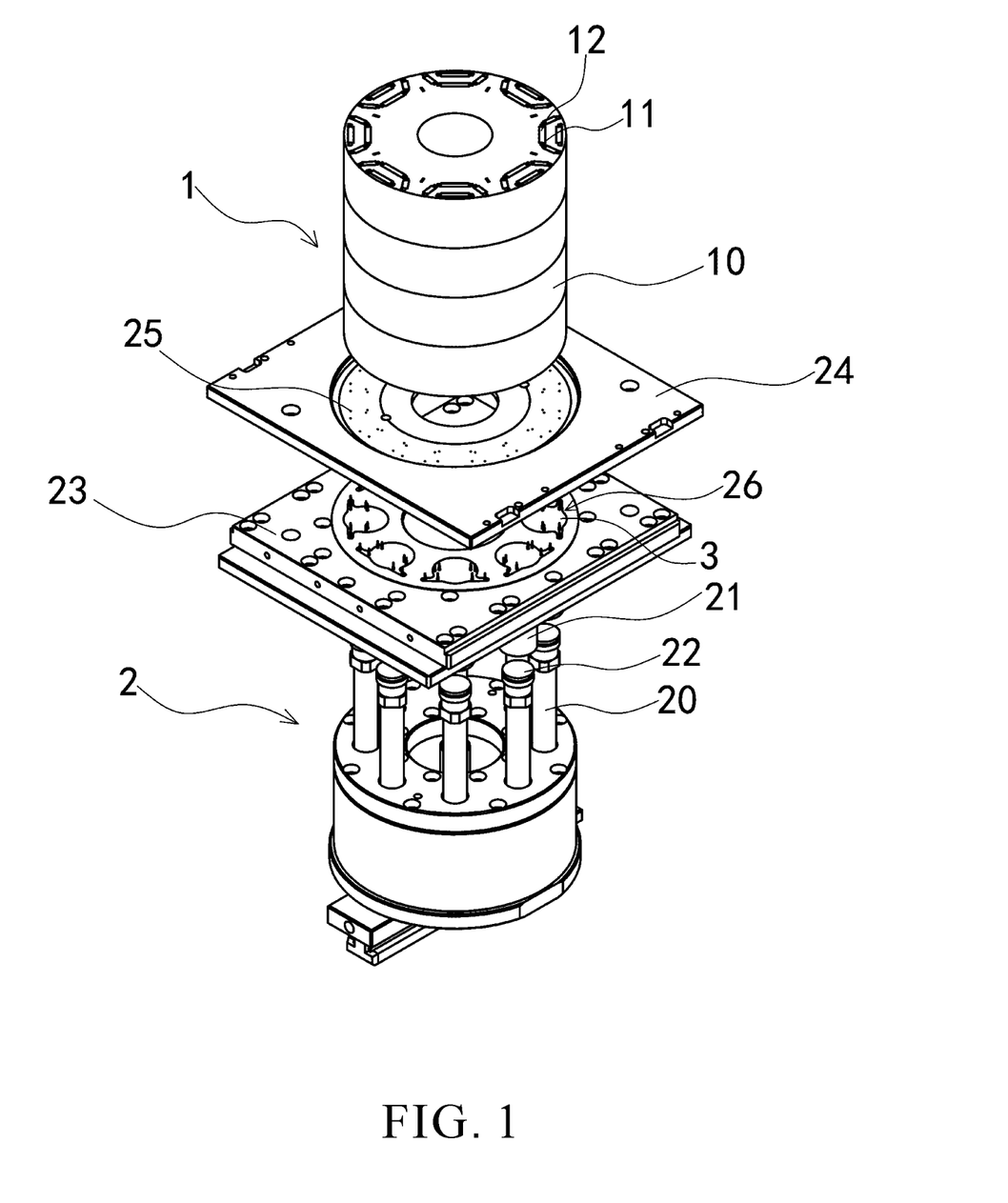
FIG. 1 is an exploded view of a dispensing device according to the first embodiment of the present disclosure, showing waste glue therein.
Figure 2:
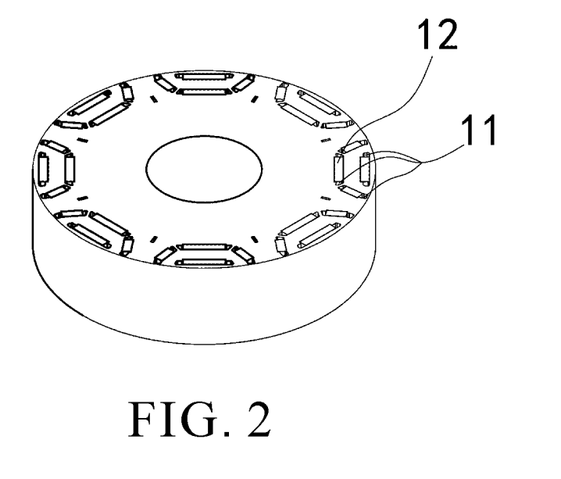
FIG. 2 is a perspective view of a rotor iron core according to the first embodiment of the present disclosure.
Figure 3:
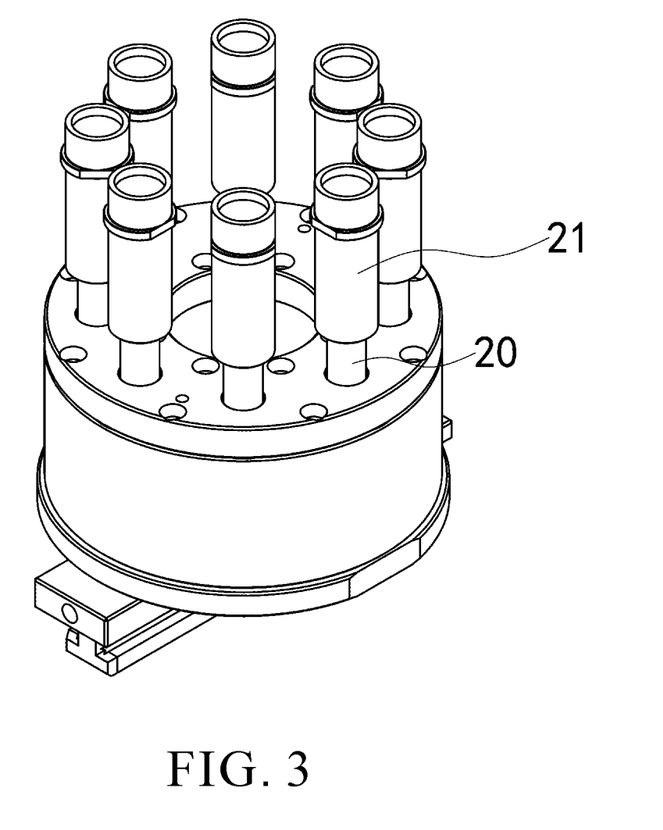
FIG. 3 is a partial perspective view of the dispensing device according to the first embodiment of the present disclosure.
Figure 4:
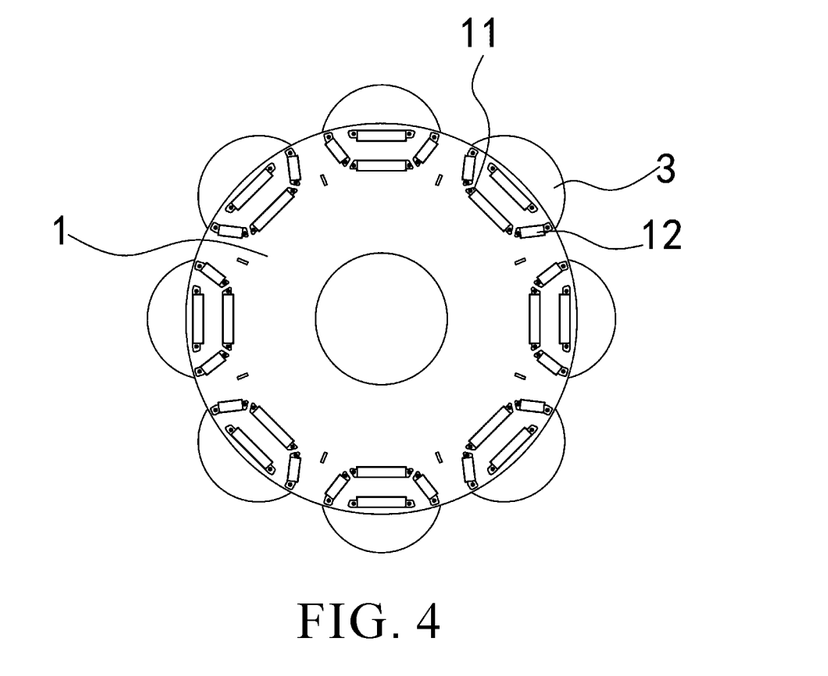
FIG. 4 is a top view of a magnetic steel chamber according to the first embodiment of the present disclosure, showing waste glue therein.
Figure 5:
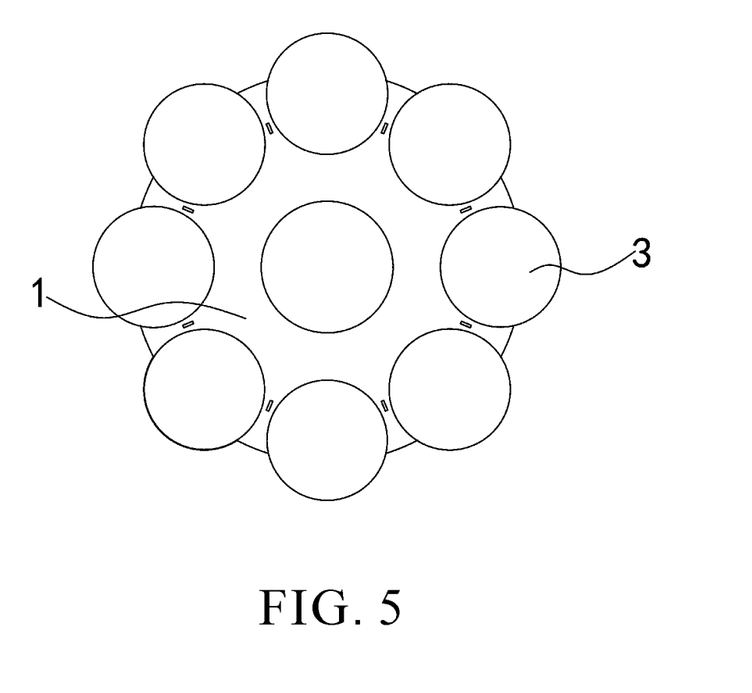
FIG. 5 is a bottom view of the magnetic steel chamber according to the first embodiment of the present disclosure, showing the waste glue therein.
Figure 8:
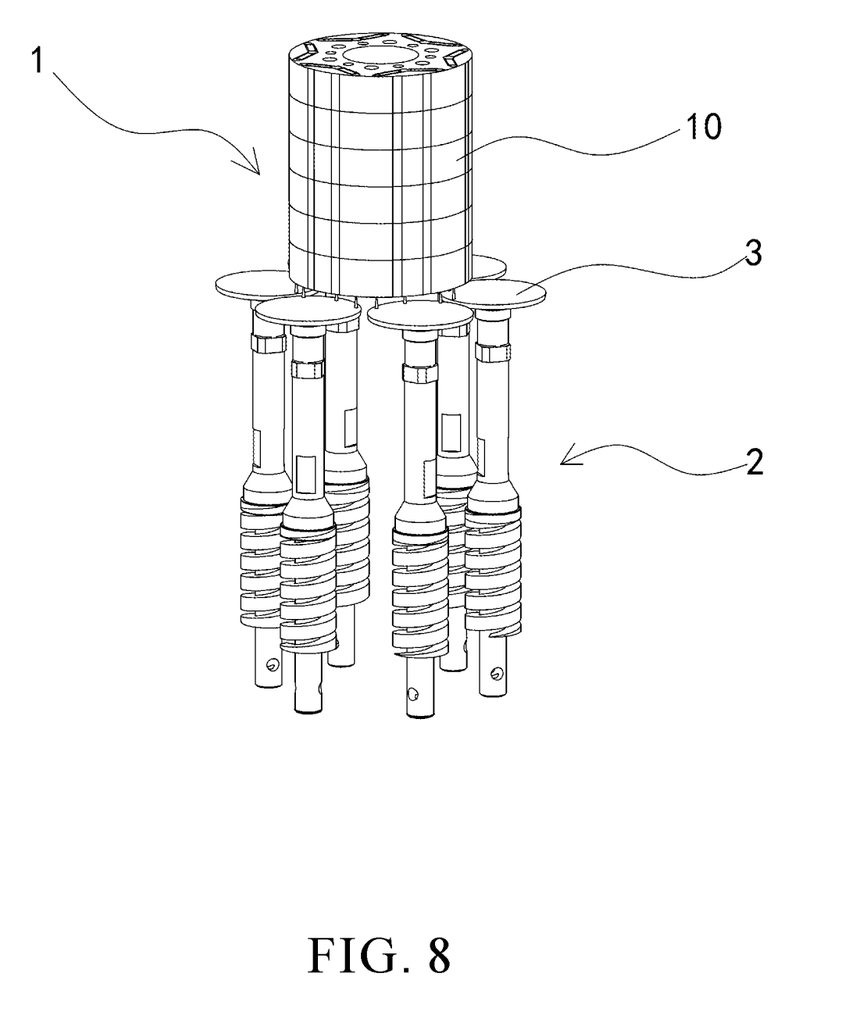
FIG. 8 is a first partial perspective view of the dispensing device according to the first embodiment of the present disclosure.
Figure 9:
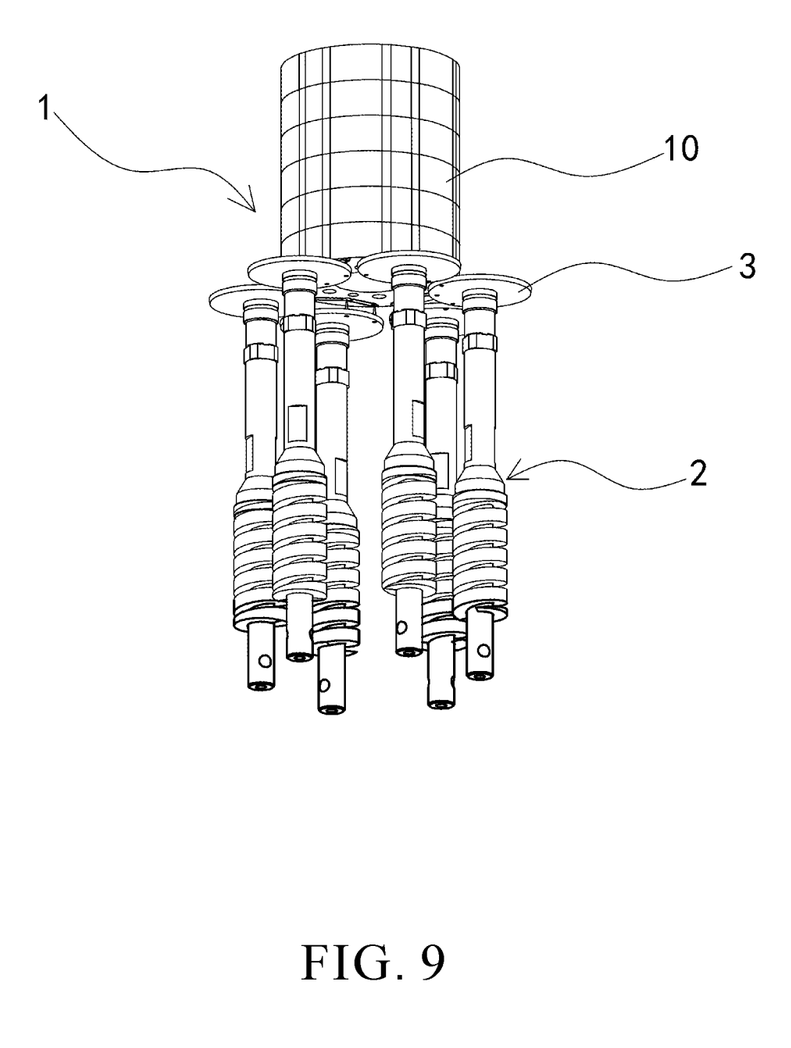
FIG. 9 is a second partial perspective view of the dispensing device according to the first embodiment of the present disclosure.

Referring to FIG. 1 and FIGS. 8, 9, in this embodiment, the dispensing units each further comprise a channel plate 23 and a dispensing plate 24. The dispensing channels 26 are disposed on the channel plate 23, correspond in position to the magnetic steel chamber 11 of the electrically-driven rotor iron core 1, and are arranged uniformly and circumferentially. The dispensing opening 25 is disposed on the dispensing plate 24 and is an upright drain passage which tapers upward. In other words, the diameter of the dispensing opening 25 on the dispensing plate 24 is tapered along to dispensing direction. The plastic in the dispensing channel 26 on the channel plate 23 passes through the dispensing opening 25, enters the magnetic steel chamber 11, and finally enters the gaps between the magnetic steel chamber 11 and the magnetic steel chunk 12. In an assembled state, the dispensing plate 24 is stacked on the channel plate 23. In a variant embodiment, the dispensing opening 25 is disposed on the channel plate 23 and formed by injection molding performed on the channel plate 23. The drain passage is raised and will work, provided that the plastic in the dispensing channel 26 on the channel plate 23 is conveyed into the through hole of the dispensing plate 24, but is not limited to this embodiment.

The second embodiment provides an electrically-driven rotor iron core magnetic steel chamber dispensing device.

Figure 6:
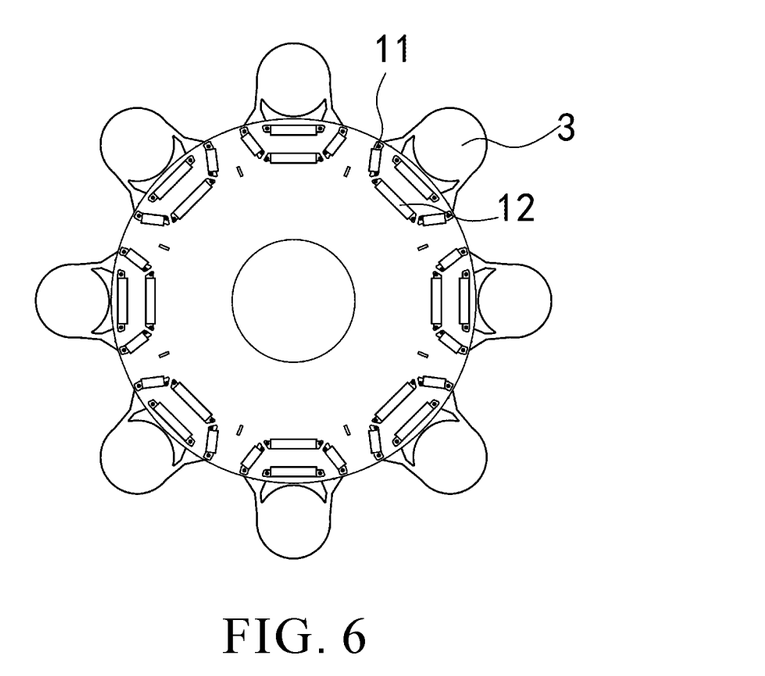
FIG. 6 is a top view of the magnetic steel chamber according to the second embodiment of the present disclosure, showing the waste glue therein.
Figure 7:
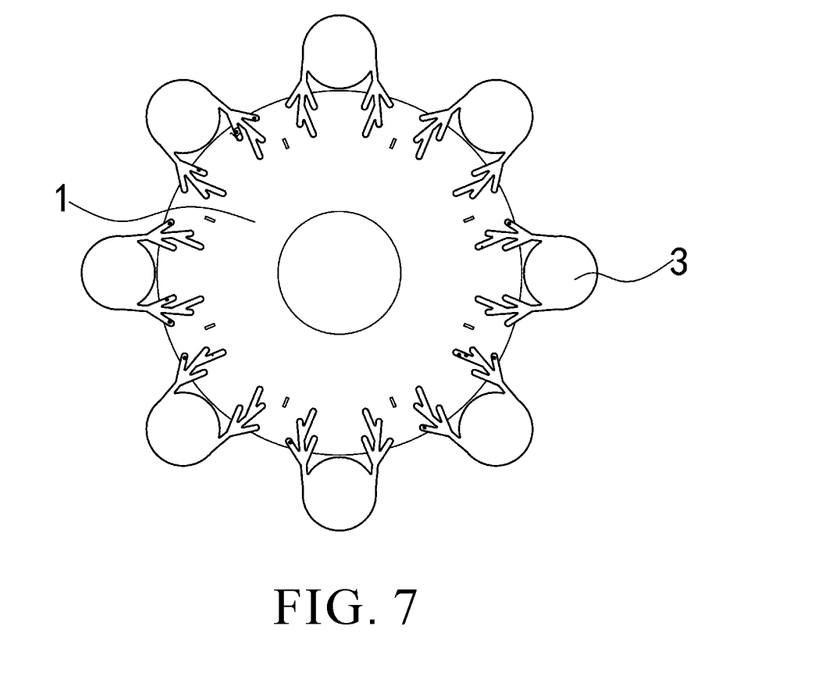
FIG. 7 is a bottom view of the magnetic steel chamber according to the second embodiment of the present disclosure, showing the waste glue therein.

Referring to FIGS. 6, 7, compared with the first embodiment, the second embodiment has some distinguishing technical features described below. The dispensing units 2 are arranged on the outside of the magnetic steel chamber 11 and positioned proximate to the magnetic steel chamber 11. The dispensing channel 26 has therein a small-sized extension passage, i.e., an extension dispensing channel, wherein the dispensing opening 25 is disposed on the extension passage. Referring to FIG. 6 and FIG. 7, waste glue 3 has an extending branch portion. Compared with the first embodiment, the second embodiment enables cost-efficient use of plastic, achieves short-distance dispensing, and attains reliable dispensing.

While the present disclosure has been described by means of specific embodiments, numerous modifications and variations could be made thereto by those skilled in the art without departing from the scope and spirit of the present disclosure set forth in the claims.

What is claimed is:

1. An electrically-driven rotor iron core magnetic steel chamber dispensing device for performing a dispensing process in gaps between a magnetic steel chamber and a magnetic steel chunk of an electrically-driven rotor iron core, the electrically-driven rotor iron core magnetic steel chamber dispensing device comprising:
 a plurality of dispensing units each corresponding in position to one or more magnetic steel chambers, arranged in a circumferential direction of the electrically-driven rotor, disposed outside the magnetic steel chamber and positioned proximate to the magnetic steel chamber, or located in a direction of a projection of the magnetic steel chamber,
 wherein a dispensing opening of each said dispensing unit corresponds in position to the magnetic steel chamber from below;
 wherein the dispensing units each comprise a dispensing channel, a dispensing head, a plunger barrel, a plunger, a channel plate and a dispensing plate, the dispensing channel is disposed above the dispensing head and in communication with the dispensing head, the dispensing head is disposed on top of the plunger barrel and in communication with the plunger barrel, the plunger is disposed in the plunger barrel to slide upward and downward relative to the plunger barrel;
 wherein the dispensing channels are disposed on the channel plate, correspond in position to the magnetic steel chamber of the electrically-driven rotor iron core, and are arranged uniformly and circumferentially;
 wherein the dispensing opening is disposed on the dispensing plate and is an upright drain passage, the diameter of the dispensing opening on the dispensing plate is tapered along the dispensing direction.

2. The electrically-driven rotor iron core magnetic steel chamber dispensing device of claim 1, the dispensing opening is disposed on the dispensing plate and is an upright drain passage which tapers such that plastic in the dispensing channel on the channel plate passes through the drain passage to therefore enter the magnetic steel chamber, wherein, in an assembled state, the dispensing plate is stacked on the channel plate.

3. The electrically-driven rotor iron core magnetic steel chamber dispensing device of claim 1, wherein the dispensing opening of each said dispensing unit corresponds in position to the gap between the magnetic steel chamber and the magnetic steel chunk from below.

4. The electrically-driven rotor iron core magnetic steel chamber dispensing device of claim 2, wherein the dispensing opening of each said dispensing unit corresponds in position to the gap between the magnetic steel chamber and the magnetic steel chunk from below.

5. The electrically-driven rotor iron core magnetic steel chamber dispensing device of claim 1, wherein the magnetic steel chamber comprises an even number of said magnetic steel chambers.

* * * * *